Inventor:
Joseph R. Hamilton
By Bair, Freeman & Molinare
Attys.

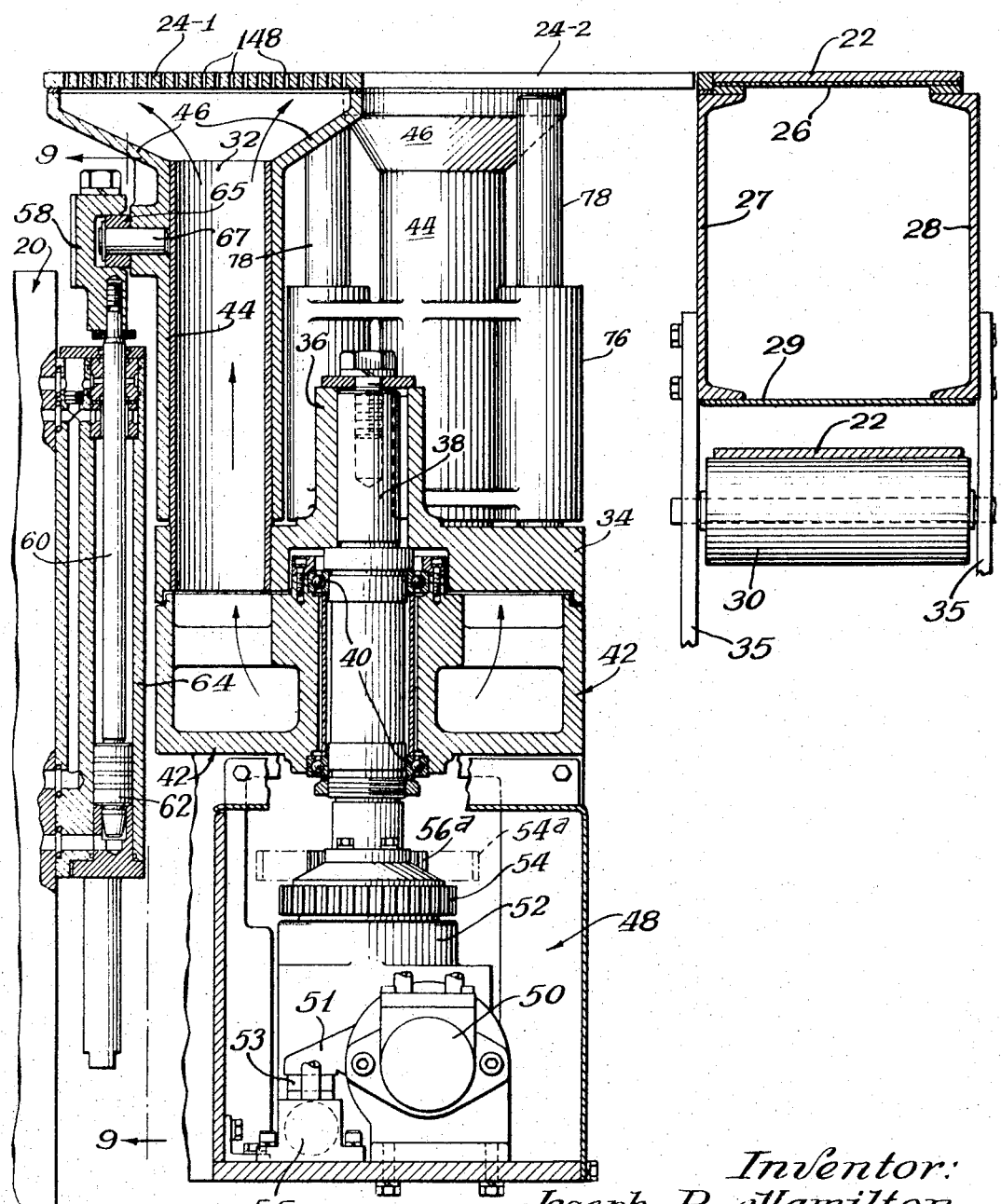

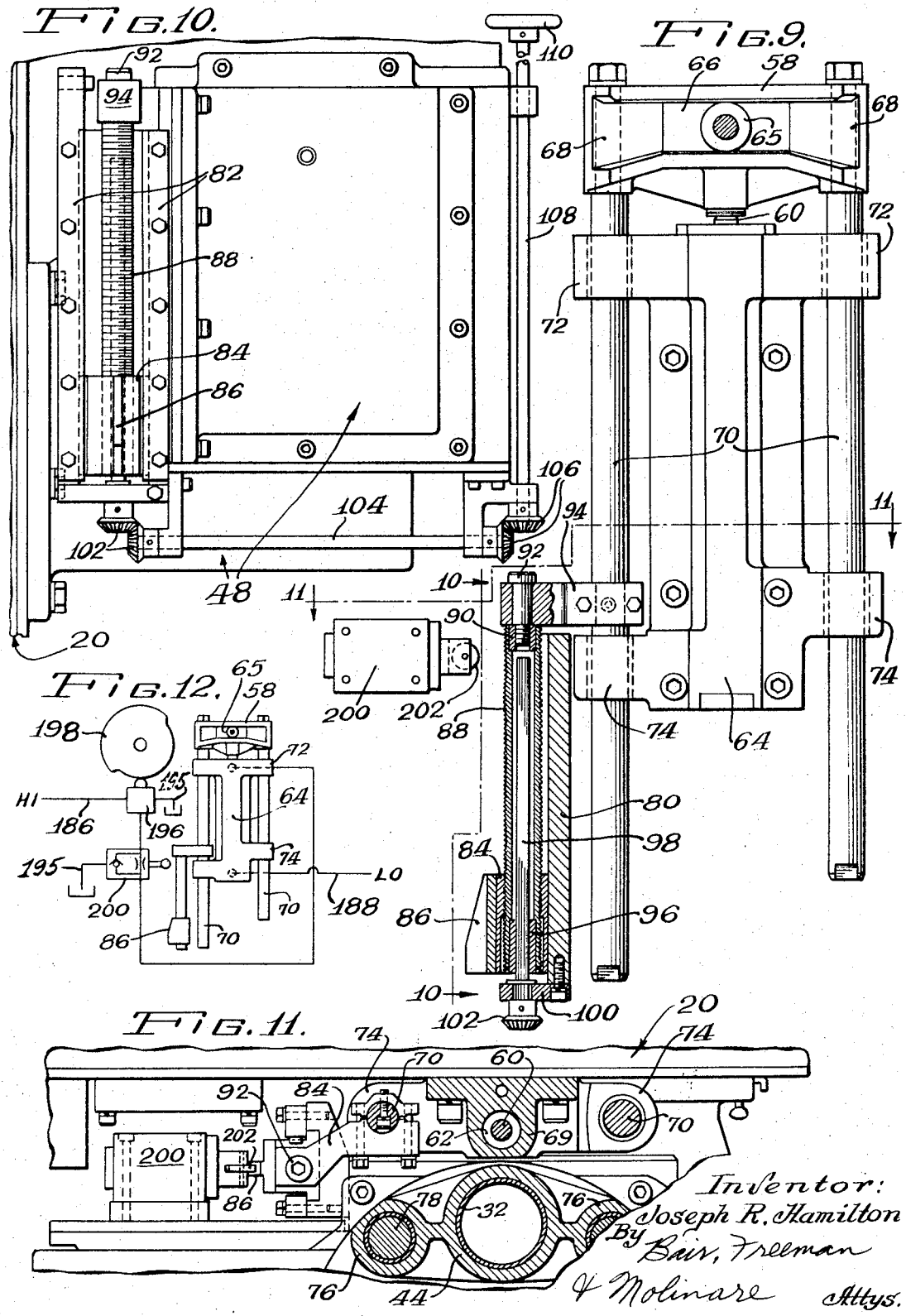

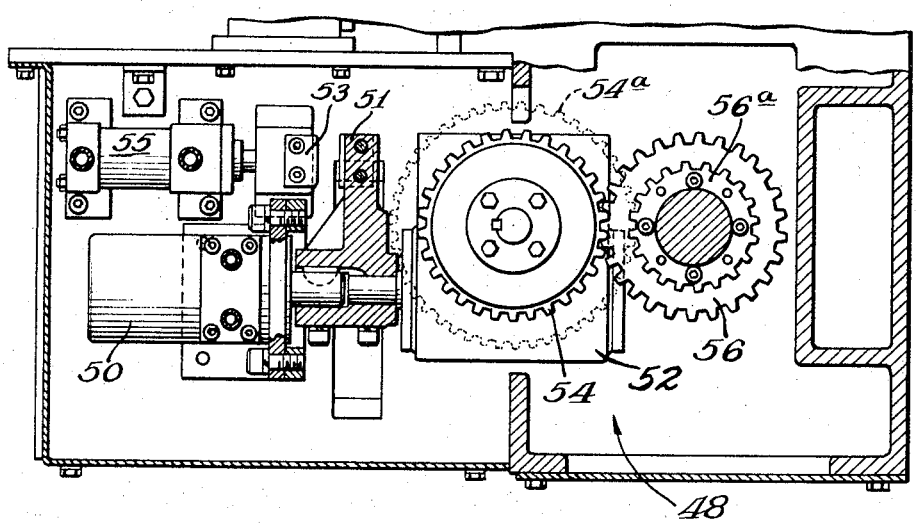
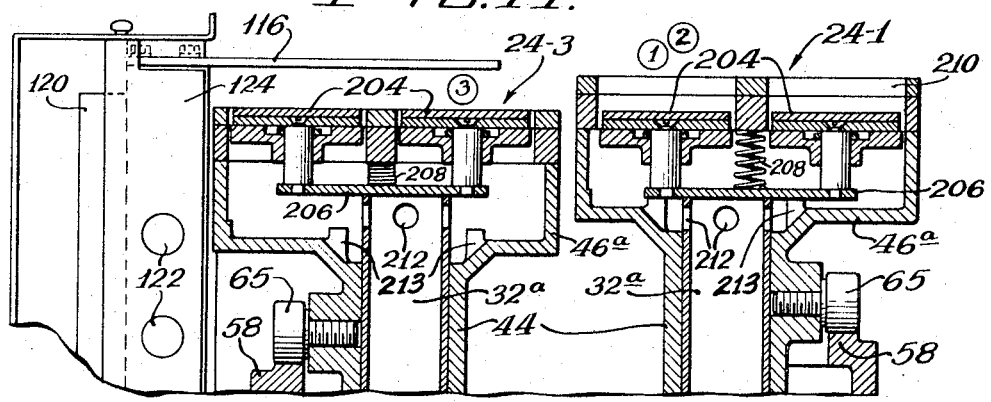
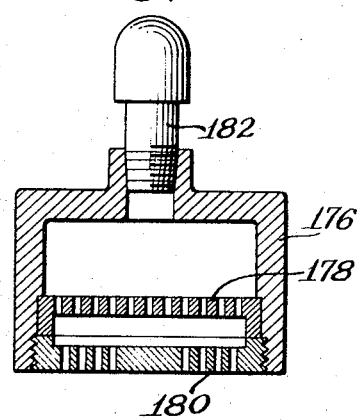
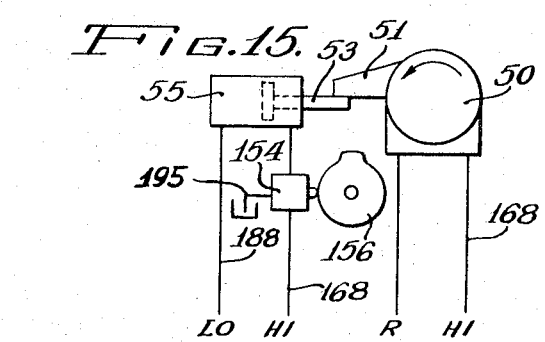

United States Patent Office 3,449,104
Patented June 10, 1969

3,449,104
ROTATING DEADPLATE MECHANISM
Joseph R. Hamilton, Anderson, Ind., assignor to Lynch Corporation, Anderson, Ind., a corporation of Indiana
Filed Dec. 20, 1965, Ser. No. 515,108
Int. Cl. C03b 25/02
U.S. Cl. 65—181
12 Claims

ABSTRACT OF THE DISCLOSURE

A three-station rotating deadplate mechanism having three deadplate sections with means to automatically and sequentially elevate the deadplate sections at a receiving station to receive freshly blown ware. The deadplate mechanism is indexed so that the section which received the ware passes through a second station, and after another indexing operation arrives at a third station, the ware all the time being cooled by wind supplied at both the second and third stations. The ware is then transferred to a take-away conveyor by a wipe-off mechanism at the third station, following which the deadplate mechanism is indexed again for bringing the deadplate section back to the receiving or first station.

---

This invention relates to a rotating deadplate mechanism particularly designed for glassware forming machines of the kind shown in Youkers Patent No. 2,874,516 and Hamilton Patent No. 3,060,707.

One object of the invention is to provide a deadplate assembly which is made in three sections and in which the sections are rotated through three stations in synchronism with the cycles of operation of the glassware forming machine, one station next to the machine where the ware is removed from the machine and deposited on one section of the deadplate assembly, a second station provided merely to extend the cooling time for the ware on the deadplate assembly and a third station for also extending the cooling time so that between the three stations there my be selectively two or three cycles of cooling time before the ware is deposited on a take-away conveyor as distinguished from deposit of the ware directly from the glassware forming machine onto a stationary deadplate from which the ware is swept directly onto a take-away conveyor as in the prior art.

Another object is to provide a wipe-off mechanism to sweep the ware off the third station of the sectional deadplate assembly and onto a take-away conveyor.

Still another object is to provide a three-section deadplate arrangement wherein the sections are intermittently rotated and may be adjusted for either 120° or 240° of rotation depending on whether three or two cycles of cooling time are required for the particular ware being handled.

A further object is to provide means for intermittently rotating the deadplate sections in the form of a hydraulic motor that constantly tends to rotate in one direction, stop means being provided to stop its rotation at a predetermined position, and control mechanism being provided to remove the stop for permitting another revolution of the motor each cycle of operation of the glassware forming machine and the rotating deadplate mechanism.

Still a further object is to provide wipe-off mechanism for the ware in the form of an oscillating hydraulic motor operable when energized in one direction to cause a wipe-off shoe to engage the ware and sweep it from the third station of the deadplate assembly across a stationary deadplate and onto the take-away conveyor, and the return movement to reposition the wipe-off shoe for the next wipe-off operation.

An additional object is to provide means for elevating each deadplate section as it reaches a first station of the mechanism so as to meet the ware being released from the glassware forming machine, thereby minimizing drop of the ware onto the deadplate section yet permitting adjustment for ware of various heights even though the neck ring of the glassware forming machine supporting the ware is always at the same elevation, the deadplate section thereupon being lowered to a suitable position for wipe-off of the ware from the deadplate section and onto the take-away conveyor.

Another additional object is to provide novel adjusting means for the elevation of the deadplate sections at the first station of the mechanism in the form of a cam-actuated valve for controlling fluid flow to a lifting cylinder for the deadplate section and wherein the cam is vertically adjustable relative to the deadplate section itself.

A further additional object is to provide a modified form of ware support in the deadplate mechanism which provides a retaining cup for the ware and an annular cylinder of cooling air discharged upwardly around the periphery of the ware.

With these and other objects in view, my invention consists in the construction, arrangement and combination of the various parts of my rotating deadplate mechanism, whereby the objects above contemplated are attained, as hereinafter more fully set forth, pointed out in my claims and illustrated in detail on the accompanying drawings, wherein:

FIG. 8 is a vertical sectional view on the line 8—8 of FIG. 2;

FIG. 9 is a vertical sectional view on the line 9—9 of FIG. 8;

FIG. 10 is an elevation, part of which is indicated by the line 10—10 of FIG. 9;

FIG. 11 is a horizontal sectional view on the line 11—11 of FIG. 9;

FIG. 12 shows that portion of the deadplate mechanism illustrated in FIGS. 9, 10 and 11 (diagrammatically) and a hydraulic circuit therefor;

FIG. 13 is a horizontal sectional view on the line 13—13 of FIG. 4;

FIG. 14 is a vertical sectional view similar to a portion of FIG. 4 showing a modification;

FIG. 15 is a diagrammatic view of a deadplate rotating mechanism and a hydraulic circuit therefor, and FIG. 16 is an enlarged section view through a fire-finishing mechanism which can be used in conjunction with my rotating deadplate mechanism, and is taken on the line 16—16 of FIG. 1.

Figure 1:
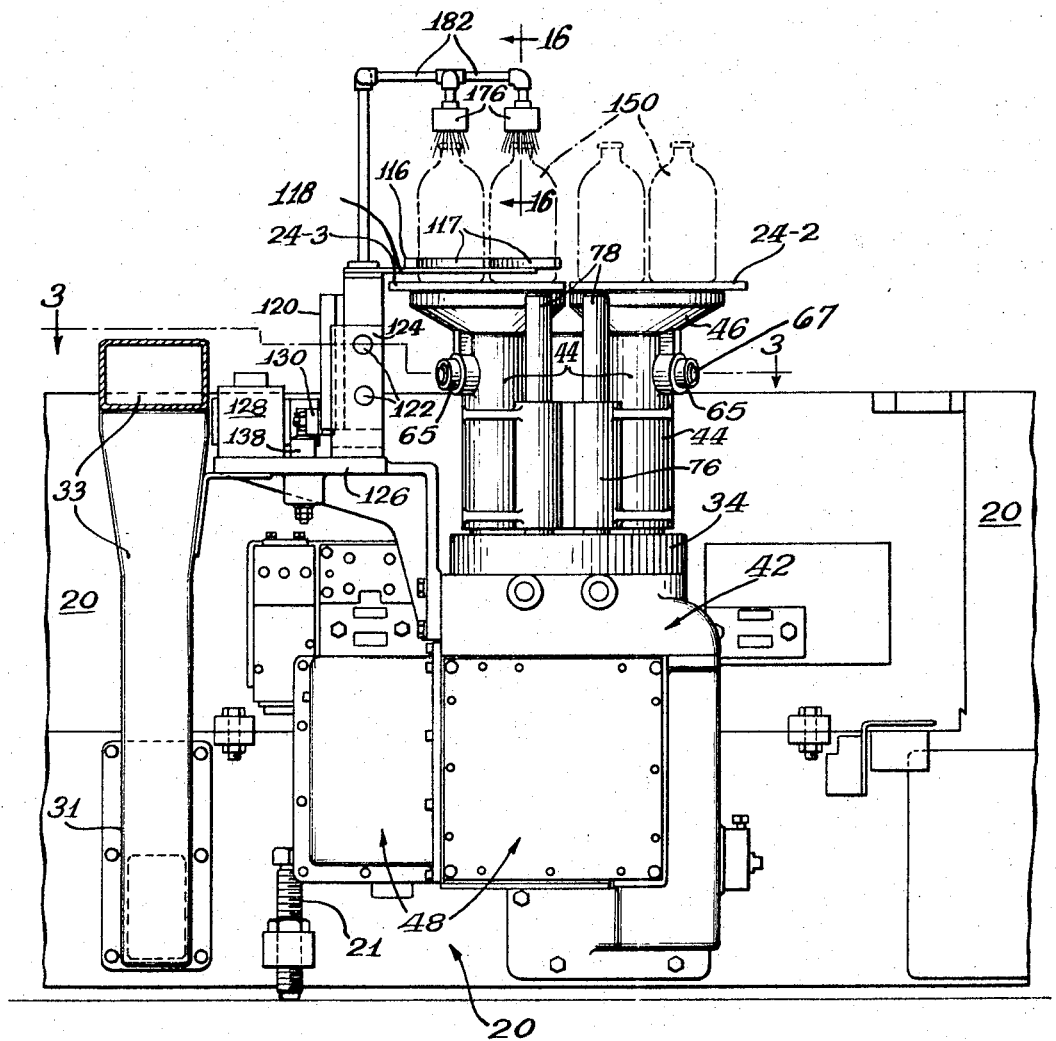
FIG. 1 is an outside elevation of a rotating deadplate mechanism embodying my invention, the far side of the mechanism being shown attached to a glassware forming machine.
Figure 2:
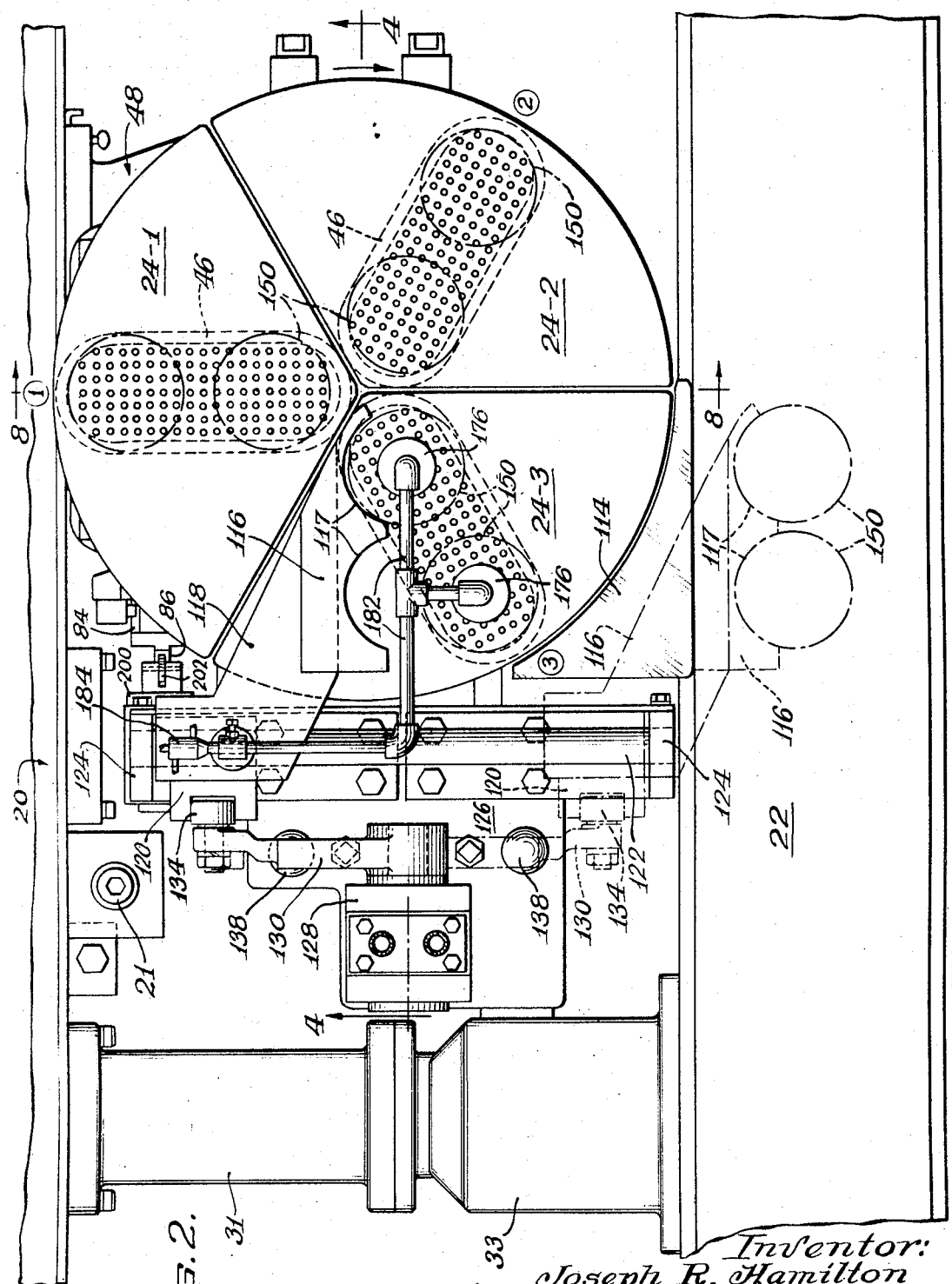
FIG. 2 is an enlarged plan view thereof.

On the accompanying drawings I have used the reference numeral 20 to indicate, in general, the frame of a glassware forming machine of the type shown in the Hamilton patent above referred to which shows a take-away conveyor and a non-rotating deadplate between the glassware forming machine and the take-away conveyor. These machines are usually provided with a plurality of leveling screws as shown at 21 in FIGS. 1, 2 and 3. In FIGS. 2 and 8 I show such a take-away conveyor at 22 and a rotating three-section deadplate 24–1, 24–2 and 24–3 spanning the distance between the glassware forming machine and the take-away conveyor.

Figure 5:
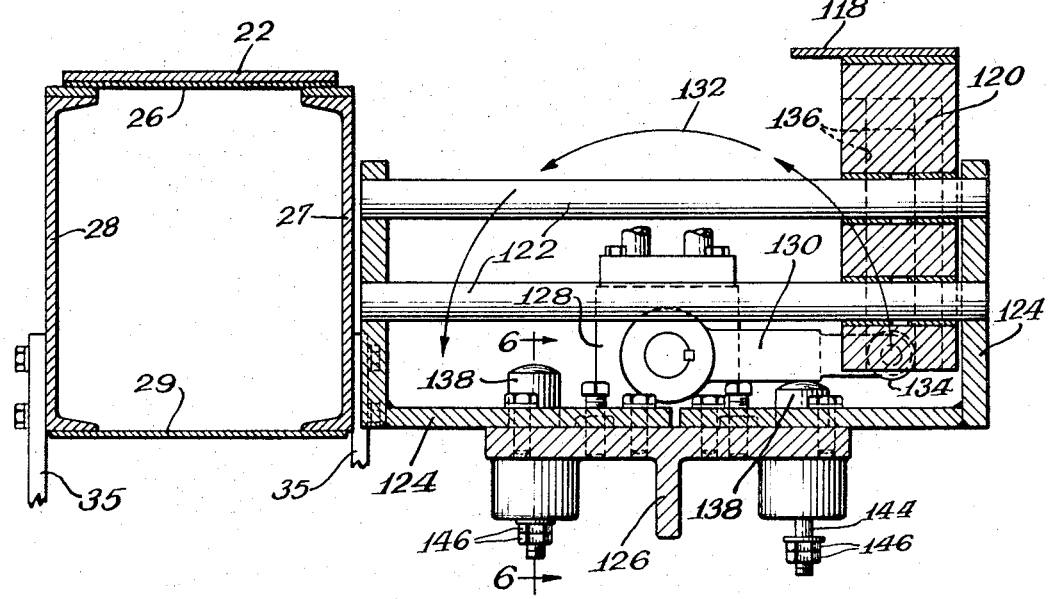
FIG. 5 is a vertical sectional view on the line 5—5 of FIG. 4.

Referring to FIGS. 5 and 8, the take-away conveyor belt 22 (usually formed of woven wire but not illustrated in detail as such) is shown. Its upper stretch is supported on a metal plate 26 of a structural steel box formation 26–27–28–29 and the lower stretch is supported on suitable rollers 30. The box formation 26–27–28–29 may be suported by suitable spacers, one of which is shown at 31, 33, in FIGS. 1, 2 and 3, and upright plates 35 shown in FIGS. 5 and 8. The spacers also serve as wind tubes.

In FIG. 8 a vertical wind tube 32 is shown, the lower end of which is supported in a turret plate 34 having a hub 36. The hub 36 is keyed to the upper end of a turret shaft 38 journaled in bearings 40 carried by a housing 42. The housing 42 is supported on a second housing 48 which in turn is supported on the glassware forming machine 20 as shown in FIG. 10. The tube 32 has vertically slidable thereon a hub 44 which is flared outwardly at its upper end as indicated at 46 to support the deadplate section 24–1 which is illustrated as being of the "double gob" type. Three of the wind tubes 32 are mounted in the turret plate 34 as shown particularly in FIG. 3, one for slidably supporting each of the three deadplate sections as described for the section 24–1 in FIG. 8.

Figure 4:
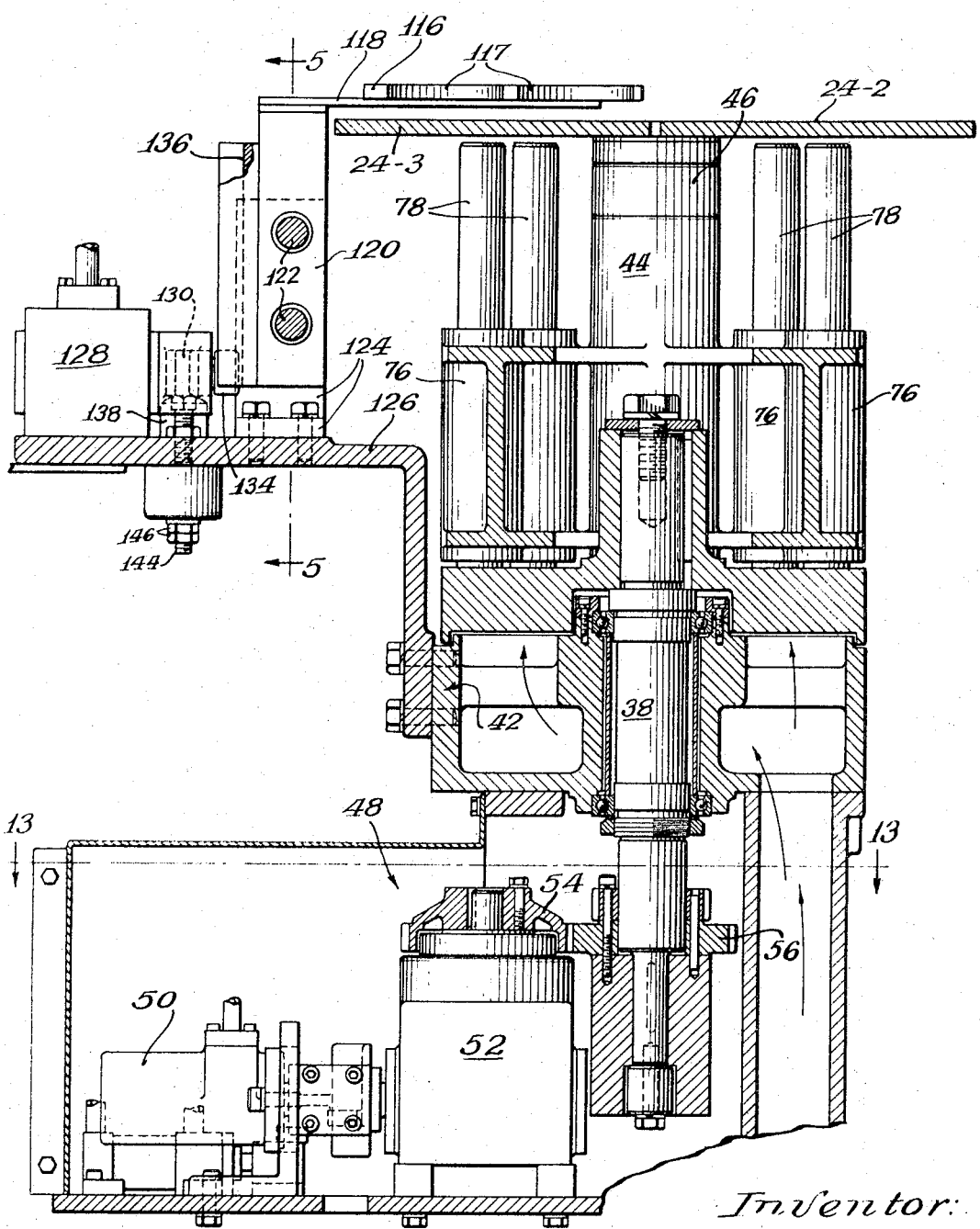
FIG. 4 is a vertical sectional view on the line 4—4 of FIG. 2.

Within the housing 48 as shown in FIGS. 4, 8 and 13, I provide a hydraulic motor 50 for rotating the turret shaft 38. The motor 50 is operatively connected through a gear box 52 to a gear 54 which meshes with a gear 56 fixed to the shaft 38. The motor 50 is constantly supplied with fluid pressure during operation of my deadplate mechanism so that it tends constantly to rotate, and is provided with a stop arm 51 adapted to be stopped by an obstruction-type stop 53 under control of a stop cylinder 55.

Stations 1, 2 and 3 are illustrated in FIG. 2 for the three deadplate sections 24–1, 24–2 and 24–3 which rotate successively through the three stations. The deadplate sections normally remain at a predetermined elevation as shown in FIG. 1 with the exception of a short period of time when that deadplate section at station 1 is lifted to substantially meet the ware as it is suspended over the deadplate section by a neck ring of the glassware forming machine whereupon the neck ring opens and permits the ware to drop approximately ⅛ inch on to the deadplate section. The deadplate section is then lowered to a normal position with its top surface at substantially the same elevation as the top surface of the take-away conveyor 22.

Figure 3:
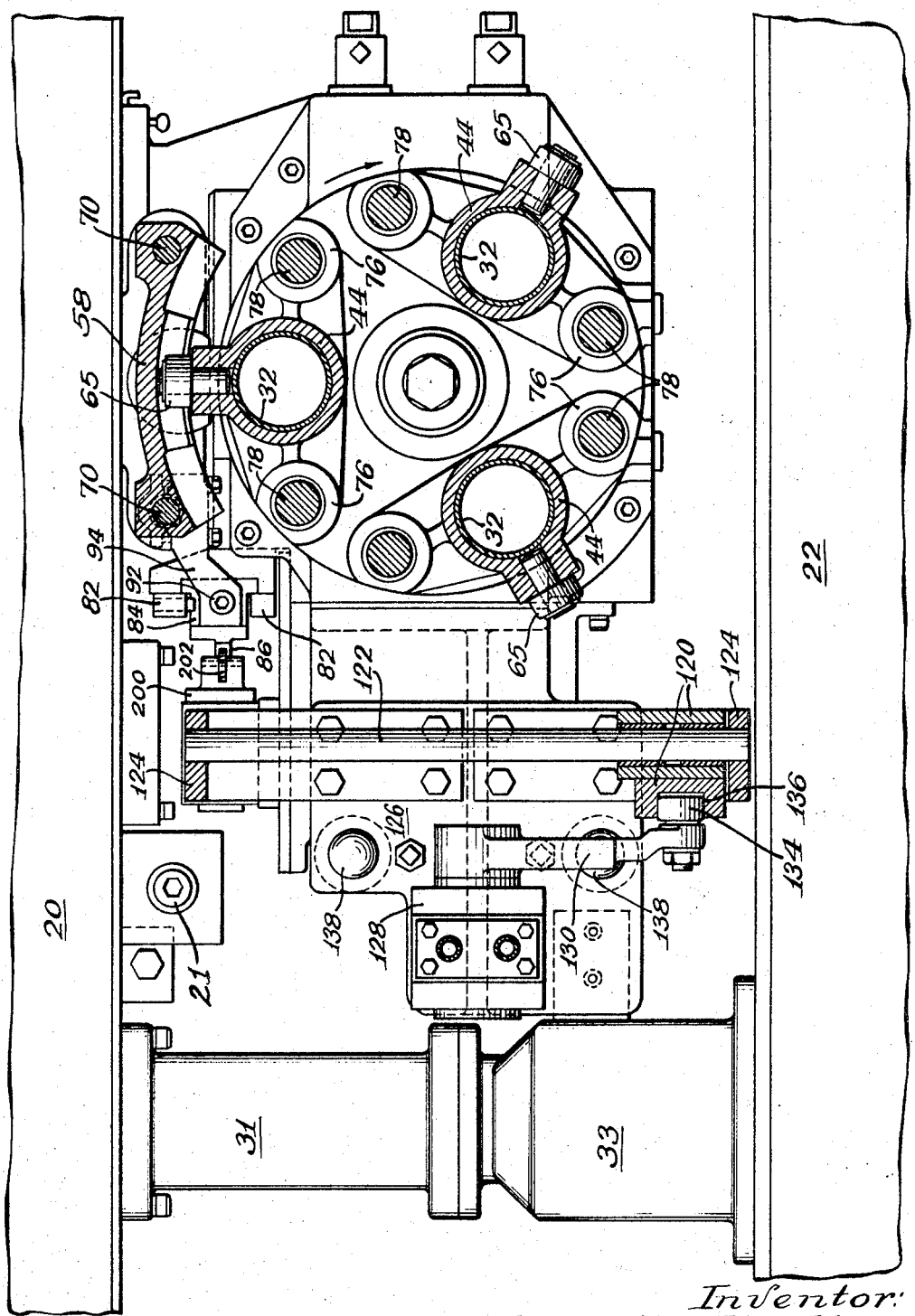
FIG. 3 is an enlarged horizontal sectional view on the line 3—3 of FIG. 1 showing details of construction of some parts of the mechanism and a plan view of other parts thereof.

For elevating each deadplate section at station 1, reference is made to FIGS. 3, 8 and 9 wherein a curved channel-shaped trackway 58 is illustrated supported on the upper end of a piston rod 60 on the lower end of which is a piston 62 within a stationary hydraulic cylinder 64. As shown in FIG. 9, the trackway 58 has a central track portion 66 in which a roller 65 substantially fits, and diverging track portions 68 at its ends to insure proper entry of the roller into and exit thereof from the trackway, with automatic adjustment of the trackway to the roller if there is slight misalignment. The trackway 58, it will be noted, has a pair of vertical guide rods 70 depending therefrom and suitably guided in upper and lower stationary bearings 72 and 74. The cylinder 64 and the bearings 72 and 74 are mounted on the glassware forming machine 20.

A guiding arrangement is provided for each of the deadplate section supporting hubs 44, each arrangement having a pair of hubs 76 as shown in FIG. 3 slidable on vertical guide rods 78. The lower ends of the guide rods 78 are rigidly mounted in the turret plate 34. A roller 65 is mounted on each hub 44 by means of a stud 67 as shown in FIG. 8.

FIGS. 9, 10, 11 and 12 illustrate a hydraulic actuating means and an adjusting means for the stroke of the piston 62 of FIG. 8 whereby the desired degree of elevation of the trackway 58 each cycle of deadplate operation may be had. This mechanism comprises a stationary base plate 80 having a pair of vertical guides 82 thereon (FIG. 10) for a cam block 84. A cam 86 is carried by the block 84. An adjusting tube 88 is threaded in the block 84 and is rotatable at its upper end on a sleeve 90 mounted on a bracket 94 by means of a screw 92. The bracket 94 is secured to one of the guide rods 70 as shown in FIG. 9.

A bushing 96 is secured in the lower end of the adjusting tube 88 and has a square opening through which a square adjusting shaft 98 slidably extends. The lower end of the shaft 98 is journaled in a bracket 100 secured to the base plate 80.

A horizontal shaft 104 is operatively connected to the adjusting shaft 98 by means of bevel gears 102 as shown in FIG. 10 and a vertical shaft 108 is operatively connected to the shaft 104 by means of bevel gears 106. The upper end of the vertical shaft 108 terminates in a hand wheel 110 at a convenient point of access for adjusting the block 84 and thereby the cam 86 vertically along the adjusting tube 88, the lowermost position and therefore the longest stroke being illustrated in FIGS. 9 and 10 whereas a higher elevation of the cam 86 results in a shorter stroke. The cam 86 is adapted to coact with a roller 202 of a cam-actuated control valve 200 for controlling the flow of fluid under pressure such as hydraulic fluid to and from the upper end of the hydraulic cylinder 64 as will hereinafter appear.

Referring to FIG. 2, a stationary deadplate 114 is shown spanning the space between the deadplate section 24–3 and the take-away conveyor 22. Means is provided for sweeping ware off the section 24–3 across the deadplate 114 and on to the conveyor 22 comprising a wipe-off shoe 116 supported by a plate-like bracket 118. The shoe 116 has a pair of suitable seats 117 to fit the ware. The bracket 118 is supported on the upper end of a slide 120 shown in FIGS. 4 and 5 adapted to slide along a pair of horizontal guide rods 122 supported by stationary brackets 124 which in turn are supported by a stationary bracket 126 secured to the housing 42 as shown in FIGS. 1, 2, 3 and 4.

An oscillating type of hydraulic motor 128 is also supported on the bracket 126 and carries an arm 130 adapted to oscillate through a 180° arc as indicated by the arrow 132 in FIG. 5. The outer end of the arm 130 carries a roller 134 slidable in a vertical slot 136 of the slide 120. Thus, oscillations of the arm 130 result in sliding motion of the slide 120 along the guide rods 122 from the position shown in FIG. 5 and by solid lines in FIG. 2 to the position shown by dot-and-dash lines in FIG. 2.

Figure 6:
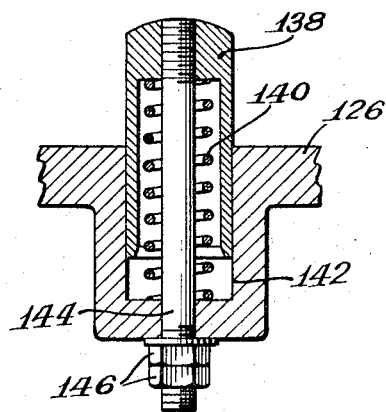
FIG. 6 is a further enlarged sectional view on the line 6—6 of FIG. 5.

In order to cushion the oscillations of the arm 130 at the ends of its throw, cushioning bumpers 138 are provided which as shown in FIG. 6 are spring-pressed upwardly by coil springs 140, the bumpers being slidable in sockets 142 of the bracket 126. The bumpers are limited in elevation under the action of the springs 140 by stop rods 144 and stop nuts 146. The hydraulic circuit for the motor 128 in shown in FIG. 7 but will be described later.

FIG. 8 illustrates the deadplate section 24–1 as having a plurality of perforations 148. As shown in FIG. 2 each of the deadplate sections 24–1, 24–2 and 24–3 has a plurality of these perforations which may be patterned for the particular size and type of ware being formed. These perforations are for the purpose of blowing air against the bottom and upwardly along the vertical cylindrical wall of the ware, the ware being shown by dotand-dash lines at 150. The particular deadplate illustrated is designed for a "double gobbing" glassware forming machine. These perforations may be of an all-over pattern such as illustrated, or with one circle of perforations just outside the wall of the ware to provide a cylinder of cooling air or wind flowing upwardly around the ware, a certain number of perforations to push the bottom of the ware up to concave shape, and further arranged to suit other conditions such as to more or less gently or forcefully supply air depending on the type of ware, its temperature and other factors.

Cooling wind is supplied in any suitable manner from a supply source for the glassware forming machine 20 through a passageway 152 shown in FIG. 4 which connects with the interior of the housing 42 and flows upwardly from the top thereof into each of the three wind tubes 32 as shown by arrows in FIGS. 4 and 8.

At station 3 the neck of the ware 150 may be fire-finished if desired by means of gas burners 176 shown in FIGS. 1, 2 and 16. The cross section in FIG. 16 shows a perforated plate 178 which may be substantially uniformly perforated for gas distribution and a perforated plate 180 for providing a desired flame pattern for the particular size and shape of ware neck being fire-finished. A gas supply pipe 182 is shown in FIG. 2 extending from a suitable gas mixer 184. If desired the neck of the ware may be partially fire-finished at station 2 and further fire-finished at station 3 by providing an additional gas burner arrangement (not shown) at station 2 in an obvious manner.

HYDRAULIC CIRCUITRY

Figure 7:
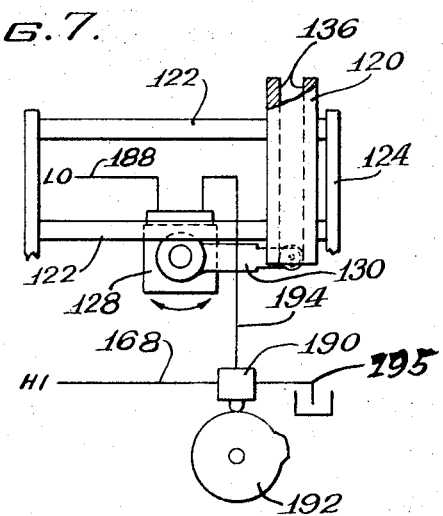
FIG. 7 is a diagrammatic showing of a ware wipe-off mechanism and an associated hydraulic circuit therefor.

Referring to FIG. 7 the hydraulic circuit for operating the wipe-off shoe 116 of FIG. 2 by actuation of the hydraulic motor 128 is shown. Two hydraulic pressure supply pipes 186 and 188 are shown, 186 being a constant high pressure supply and 188 a constant low pressure supply. A timer valve 190 is actuated by a timer cam 192 of the glassware forming machine each cycle of operation of the machine to cause the motor 128 to oscillate counterclockwise in FIG. 5 for moving the bracket 118 and thereby the wipe-off shoe 116 from the full line position to the dot-and-dash line position shown in FIG. 2, the latter being also the position shown in FIG. 3. When the cam lobe of the cam 192 passes the valve 190, the valve recloses, thus cutting off communication between the pressure supply pipe 168 and the line 194 which permits the valve 190 to communicate the line 194 with a return 195 to tank so that low pressure in the pipe 188 is then effective to return the motor 128 to the position shown in FIG. 5.

Referring to FIG. 12 the constant high pressure supply pipe 186 and the constant low pressure supply pipe 188 are shown here also. They control the reciprocations of the piston 62 in the cylinder 64 which is urged upwardly by the low pressure in the line 188 and downwardly by high pressure under the control of a second timer valve 196 and a second timer cam 198 in conjunction with the cam-actuated control valve 200 and its roller 202 to be actuated by the cam 86 of FIG. 9 when the cam moves upwardly to a position of contact therewith. Thereupon the valve 200 stops the upward stroke of the piston 62 until such time as the cam 198 actuates the timer valve 196 to lower the piston.

Referring to FIG. 15, the hydraulic circuit for intermittent rotation of the turret plate 34 is illustrated. The constant high pressure supply pipe 186 and the constant low pressure supply pipe 188 are shown here also. The hydraulic motor 50 constantly tends to rotate counterclockwise but is normally stopped against rotation by engagement of the stop arm 51 against the stop 53. A timer valve 154 is normally closed and is actuated by a cam 156 on the glassware forming machine timer at the proper time to open the valve 154 for momentarily removing the stop 53 from its obstructing position with respect to the stop arm 51. Thereupon the motor 50 starts to rotate and before the arm 51 completes its revolution, the timer valve 154 recloses so that the stop 53 is again in position to stop rotation of the arm 51. The line R from the motor 50 is a return line to the tank.

The gears 54 and 56 shown in FIG. 13 (which are at 1:1 ratio) produce 120° of rotation of the deadplate mechanism, each rotation of the hydraulic motor 50. This is accomplished by having a 3:1 gear reduction in the gear box 52. In some instances, however, it is desirable to rotate the deadplate mechanism 240° each rotation of the motor 50 (as, for instance, when small bottles are being blown and less cooling time on the deadplate mechanism is required). This may be accomplished by providing a second gear 56$^a$ secured to the gear 56, and substituting for the gear 54 a second gear 54$^a$ meshing with the gear 56$^a$. The gears 54$^a$ and 56$^a$ have a 2:1 ratio.

In the modification shown in FIG. 14, two deadplate sections 24–1 and 24–3 are illustrated as well as the hubs 44 for them but the flare pattern 46$^a$ is different than at 46 in the previous figures. Also, a modification of the wind tubes 32 is shown at 32$^a$. Since they are stationary and the hubs 44 are vertically reciprocable thereon, the hubs will appear at station 2 as shown at the right side of the figure and at station 3 as at the left side. The hub 44 at station (1) will appear at certain times as shown at the right side of the figure.

Ware supporting discs 204 are carried by plates 206 normally held against the tops of the wind tubes 32$^a$ by springs 208 so that at stations 1 and 2 a ring 210 carried by the flared portion 46$^a$ serves as a cup to receive the lower end of the ware and prevents its dislocation. At the same time, the ring in conjunction with the disc 204, which is slightly less in diameter than the ring, provides an annular cylinder of air blowing up around the ware, the air coming from the wind tube 32$^a$ through openings 212 adjacent its upper end.

At station 3 when the hub 44 is lowered, the relationship of parts is shown at the left side of the figure, the upper end of the ring 210 being substantially coincident with the upper surface of the ware-supporting discs 204 so that the ware can be swept across the edge of the ring by the wipe-off shoe 116 and across the stationary deadplate 114 onto the take-away conveyor 22. At station 1 before the discs 204 are elevated to meet the ware and after they are lowered from the elevated position and at station 2 the rings 210 form the cups above referred to, the plates 206 at that time resting on projections 213. At station 1 when the hub 44 is elevated farther upwardly than shown at the right side of FIG. 14, these projections will elevate the plate 206 and thereby the discs 204 simultaneously with the elevation of the hub 44 and its flared portion 46$^a$. At this time the openings 212 will be closed off by the elevation of the hub 44 past them but the upper end of the tube 32$^a$ will be open to permit continued flow of the cooling wind.

From the foregoing specification it will be obvious that I have provided a rotating deadplate mechanism which extends the cooling time of ware removed from a glassware forming machine before the ware is placed on a take-away conveyor. The construction is such that cooling can be controlled by deadplate perforation design or by design of the deadplate itself such as shown in the modification of FIG. 14.

Some changes may be made in the construction and arrangement of the parts of my rotating deadplate mechanism without departing from the real spirit and purpose of my invention, and it is my intention to cover by my claims and modified forms of structure or use of mechanical equivalents which may reasonably be included within their scope.

I claim as my invention:

1. In a rotating deadplate mechanism for glassware forming machines, a deadplate for receiving ware from the machine and delivering it to a take-away conveyor, said deadplate comprising a carrier and three normally depressed deadplate sections carried thereby and vertically movable relative thereto, means for mounting said carrier for indexing rotation through three stations, first a receiving station adjacent the glassware forming machine, second an idle station and third a station adjacent the take-away conveyor, a second means for rotating said mounting means for said carrier through said three stations in succession with a period of pause at each station corresponding to an operating cycle of the glassware forming machine, means for supplying cooling wind to said deadplate sections at each of said stations for effecting cooling of the ware during three glassware forming machine cycles between delivery of the ware to said deadplate and delivery of the ware from said deadplate to the take-away conveyor, and means for elevating said deadplate sections at only said receiving station to substantially meet the ware delivered from the glassware forming machine to said receiving station.

2. A rotating deadplate mechanism according to claim 1 wherein said second means comprises a fluid pressure motor tending to constantly rotate said carrier, an obstruction-type stop for said motor, and means operable in timed relation to the glassware forming machine to remove said stop momentarily to permit said motor to effect rotation of said carrier and thereby said deadplate sections from one station to the next one each cycle of operation of the glassware forming machine.

3. A rotating deadplate mechanism according to claim 1 wherein a wipe-off mechanism is provided for the ware at the third station to sweep it from said deadplate and onto the take-away conveyor, and comprises a wipe-off shoe movable across the top of said deadplate sections when in their normally depressed positions and over the take-away conveyor, a slidably mounted carrier for said wipe-off shoe, an oscillating fluid pressure motor having an arm operatively connected with said carrier, and means for automatically controlling said motor so as to oscillate it once each cycle of operation of the glassware forming machine.

4. A rotating deadplate mechanism according to claim 1 wherein said means for elevating said deadplate sections at the first station from a normally depressed elevation to meet the ware delivered from the glassware forming machine includes track and projection mechanism which coact at only said first station.

5. A rotating deadplate mechanism according to claim 4 wherein a fluid pressure actuator is provided for said elevating means, means for controlling said actuator in synchronism with the cycling of the glassware forming machine, a control valve for the fluid pressure to said actuator, said elevating means including an actuator for said control valve, and means for controlling the position of said last mentioned actuator in relation to said elevating means to accommodate ware having different bottom surface elevations at the delivery station of the glassware forming machine.

6. In a rotating deadplate mechanism for glassware forming machines, a deadplate for receiving ware from the machine and delivering it to a takeaway conveyor, said deadplate comprising a carrier having three wind delivery tubes extending upwardly therefrom, a normally depressed deadplate section telescopically carried by each of said wind delivery tubes and vertically movable relative thereto, means for mounting said carrier for indexing rotation through three stations, first a receiving station adjacent the glassware forming machine, second an idle station, and third a station adjacent the take-away conveyor, said means for mounting said carrier comprising a hollow housing, a second means for rotating said mounting means for said carrier with respect to said hollow housing through said three stations in succession with a period of pause at each station corresponding to an operating cycle of the glassware forming machine, means for supplying cooling wind to said hollow housing, said wind delivery tubes communicating with the interior of said hollow housing and thereby conducting such wind through said telescopic connections to said deadplate sections at each of said stations for effecting cooling of the ware during three glassware forming machine cycles between delivery of the ware to said deadplate and delivery of the ware from said deadplate to the take-away conveyor, and means for elevating said deadplate sections to substantially meet the ware delivered from the glassware forming machine to said receiving station.

7. A rotating deadplate mechanism according to claim 6 wherein said means for elevating said deadplate sections is provided at only said receiving station and successively coacts with each of said deadplate sections at only said receiving station.

8. A rotating deadplate mechanism according to claim 6 wherein said deadplate section has a hub which slides telescopically on said wind tube whereby to permit operation of said elevating means and the actuator therefor and maintain a path for wind from said wind tube through said hub to said deadplate section during elevating and lowering operations, and said elevating means includes track-and-roller means at said receiving station.

9. A rotating deadplate mechanism according to claim 6 wherein a hub is provided telescopically slidable on said wind tube, said deadplate section being carried thereby, said hub having a cylindrical portion surrounding said deadplate section, said deadplate section being smaller in diameter than said cylindrical portion whereby wind from said wind tube passes up around the periphery of said deadplate in cylindrical form to cool the cylindrical surface of the ware.

10. A rotating deadplate mechanism according to claim 9 wherein said cylindrical portion is elevated relative to said deadplate section by engagement of said deadplate with the upper end of said wind tube as said hub and said cylindrical portion are elevated relative to said wind tube at the first and second stations to form a retaining pocket for the ware.

11. A rotating deadplate mechanism according to claim 10 wherein said elevating means at the first station for said deadplate section and said cylindrical portion comprises a roller on said hub, a channel-shaped track to receive said roller and fluid pressure means operating in timed relation to the cycles of operations of the glassware making machine to raise and lower said track while said roller is therein.

12. A rotating deadplate mechanism according to claim 6 wherein a wipe-off mechanism is provided for the ware at the third station to sweep it from said deadplate and onto the take-away conveyor and comprises a wipe-off shoe movable across the top of said deadplate sections and over the take-away conveyor, a slidably mounted carrier for said wipe-off shoe, an oscillating fluid pressure motor having an arm operatively connected with said carrier, and means for automatically controlling said motor so as to oscillate it once each cycle of operation of the glassware forming machine.

References Cited

UNITED STATES PATENTS

| 1,642,421 | 9/1927 | Lorenz | 65—260 X |
| 1,921,393 | 8/1933 | Lorenz | 214—1 |
| 2,355,036 | 8/1944 | Berthold | 65—167 X |
| 3,186,822 | 6/1965 | Rieck | 65—181 X |
| 3,362,807 | 1/1968 | Wiley | 65—167 X |

DONALL H. SYLVESTER, Primary Examiner.

A. D. KELLOGG, Assistant Examiner.

U.S. Cl. X.R.

65—167, 227, 241; 214—1